July 11, 1967     W. A. McRAE ET AL     3,330,750
REMOVAL OF GASES BY ELECTRODEIONIZATION
Filed June 20, 1962
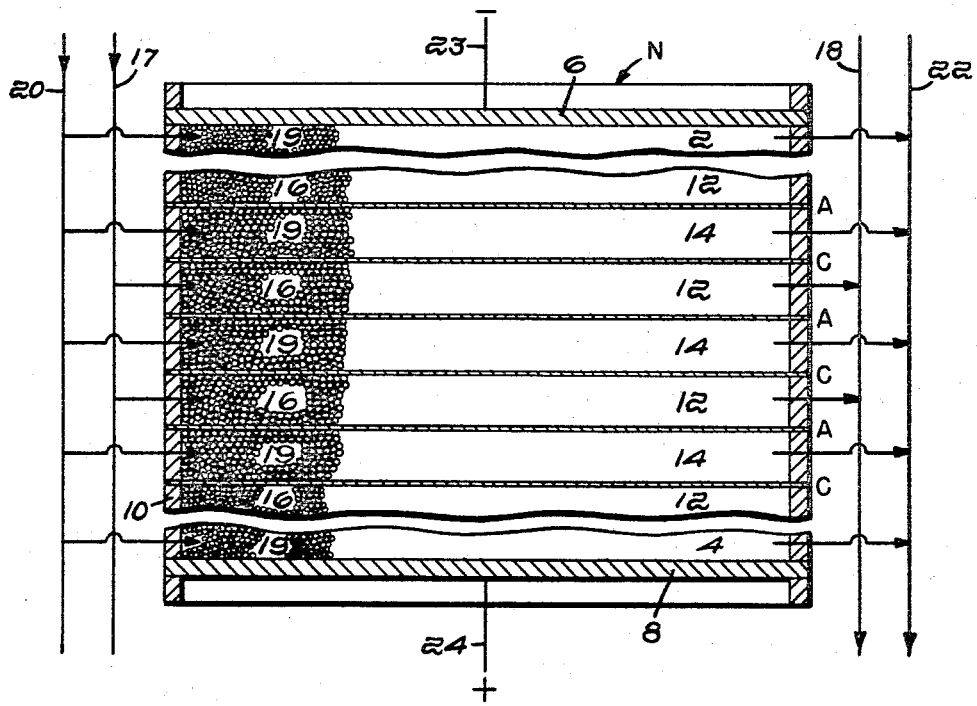
A = ANION PERMEABLE MEMBRANE
C = CATION PERMEABLE MEMBRANE
Inventors:
Wayne A. McRae,
Peter N. Rigopulos,
by
Attorney United States Patent Office 3,330,750
Patented July 11, 1967

3,330,750
REMOVAL OF GASES BY ELECTRODE-IONIZATION
Wayne A. McRae, Lexington, and Peter N. Rigopulos, Brighton, Mass., assignors to Ionics, Incorporated, Cambridge, Mass., a corporation of Massachusetts
Filed June 20, 1962, Ser. No. 203,992
8 Claims. (Cl. 204—180)

This invention relates to methods and apparatus for the sorption of at least partially ionizable low molecular weight substances, from mixtures of the same with liquid and/or gaseous fluids in which the substances are not appreciably ionized. More specifically, it relates, for example to the removal of carbon dioxide gas from atmospheric air and to the removal of mercaptans, for example the alkyl mercaptans, from gasoline. For the purpose of this disclosure, an ionizable low molecular weight substance is a substance of low molecular weight which is at least partially soluble in water, the resulting solution containing ions derived from the substance. Similarly, a weakly acid substance and a weakly basic substatnce are defined as substances which, in the presence of water, form a weakly ionized acid and a weakly ionized base, respectively. The words sorption, sorb, etc., as used herein refer to the phenomena of "taking up another substance" whether this occurs by a process of absorption or adsorption. Thus, by such definition, a sorbing agent or material is one that absorbs or adsorbs another substance. For the purposes of this disclosure "gas" as used herein includes non-condensible gases as well as condensible vapors, and "fluid" includes both liquids and gases.

The sorption of low molecular weight ionizable substances by liquid or solid sorbing agents is a well-known process in the chemical industry. For example, before natural gas or gasoline are sold to the public, the contaminants of $CH_3SH$, $H_2S$, $SO_2$, etc., are removed. Air pollution control requires the removal of $H_2S$, $SO_2$, $NO_2$, etc. Also, the removal of $CO_2$ from anesthetic vapor gases (after the anesthetic gas has been exhaled by a patient) for purposes of reuse, has assumed importance for economic and safety reasons. The maintenance of a life-supporting atmosphere in a confined, isolated environment, such as a space vehicle, or submerged submarine, requires the removal of carbon dioxide gas from air or oxygen. Logistic considerations make it necessary to employ a sorbing material that is readily regenerable. Generally, carbon dioxide gas is taken up by a solid or liquid sorbing agent and upon exhaustion the latter material is regenerated to its original state; that is, the sorbed carbon dioxide is removed therefrom. Thus, carbon dioxide is removed from air, and during regeneration is released in concentrated form. Economic considerations require that the sorbing material remain unconsumed during the sorbing or regenerating cycle.

The systems heretofore most generally used for carbon dioxide removal are briefly described as follows:

(1) Sorption by a caustic hydroxide. This system is complete and rapid, but it has the disadvantage of not being readily regenerable. Carbon dioxide can be removed rapidly from an atmospheric air stream by suitable contact of the gas phase with an aqueous caustic solution as, for example, LiOH or NaOH. Sorption of the carbon dioxide is effected in accordance with the following chemical reaction wherein M is any metal which forms a soluble hydroxide:

$$CO_2 + 2MOH \rightarrow 2MCO_3 + H_2O$$

The formation of the carbonate is practically irreversible and excessively high temperatures are required for effective thermal regeneration; therefore, cyclical operation is not practical. Caustic solutions are also used for the removal of $H_2S$ and mercaptans from natural gas and gasoline in a manner entirely similar to that used for removal of $CO_2$ from air.

(2) Sorption by anhydrous microporous zeolites. Such zeolites are made of alkali metal aluminosilicates and possess certain physical properties which make them effective for the sorption of many low molecular weight substances from gases or liquids. The sorption of carbon dioxide is thermally reversible and is not as complete or rapid as by alkali-hydroxides. The zeolites are used in columns which must be long enough to allow sufficient time for carbon dioxide (or other low molecular weight substance) to be sorbed out of the contacting air. Furthermore, such zeolites preferentially sorb water vapor which results in replacement of more loosely held substances. Thus, it is necessary to dehumidify the feed stream prior to entering the sorber beds. Another disadvantage of zeolites is that a high regeneration temperature ($\sim 600°$ F.) is required, preferably in a vacuum. Therefore, for example, to obtain continuous carbon dioxide removal, multiple beds on alternate cycles of exhaustion, thermal regeneration and cooling are required.

(3) Sorption of carbon dioxide by solutions of alkaline amines. Solutions of this type have the ability to sorb carbon dioxide at room temperature and to release the same at elevated temperatures. The most widely used, well-known organic sorbing agent is MEA (monoethanolamine). Air containing carbon dioxide is contacted with a cool solution of MEA and the latter is then regenerated thermally by boiling under pressure. The sorption is reversible and, therefore, incomplete and slow necessitating large volumes of sorption solution. MEA has poor oxidative stability and slowly decomposes in use giving off odorous and toxic fumes. MEA itself has a fairly high vapor pressure and a high toxicity—1 p.p.m. in the atmosphere being considered hazardous. The addition of more MEA is required from time to time to keep the sorber up to full strength. Other water soluble gases such as $H_2S$, $CH_3SH$ and $NH_3$ are now removed commercially by processes similar to those described above.

The method of this invention which will be described hereinafter eliminates the disadvantages associated with the sorber systems described above by using a novel electrochemical procss. In general, this invention utilizes as the sorbing agent an electrically conducting solid, particulate, insoluble, polymeric ion-exchange material which is regenerated electrically with no attendant decomposition. Since heat is not required for regeneration and because the agent is a high molecular weight solid, thermal degradation of the ion-exchange material does not occur. The ion-exchange material is similar in its chemical activity to a strong base or to a strong acid, thus rapidly and irreversibly sorbing weakly acid and/or weakly basic substances respectively. Regeneration is obtained in the case of $CO_2$ removal for instance, by the electrical migration of carbonate and/or bicarbonate ions from the ion-exchange sorber material through ion-exchange membranes to concentrating or stripper chambers. The same current which causes migration of bicarbonate ions (or other conjugate ions in the case of ionizable substances other than carbon dioxide) from the sorber material is used to dissociate water into hydrogen and hydroxyl ions. The hydroxyl ions then regenerate the ion-exchange material back to its original hydroxyl form, and the hydrogen ions neutralize the carbonate and/or bicarbonate ions reforming water and concentrated carbon dioxide.

It is, therefore, an object of this invention to provide apparatus and a process for the continuous sorption of weakly acidic or weakly basic substances from liquid or gaseous fluids. More particular objects are the removal of carbon dioxide gas from an air stream and of mercaptans from petroleum fluids. A further object is electrically to regenerate the sorbing material continuously without attendant decomposition of said material.

It is well known in the art that weakly acidic substances or their labile anhydrides, for example, carbon dioxide, can be removed from a fluid in which it is mixed by passage of the latter through a bed of a strongly basic anion exchange resin which has previously been put into its hydroxyl form. This non-electric method of carbon dioxide removal can also be used to remove other weakly acid substances or other labile anhydrides such as methyl mercaptan, hydrogen sulfide, sulfur dioxide, acetic acid, etc. These substances will form weakly ionized acids when dissolved in water and are sorbed easily on hydroxyl-form strong anion exchange resins. Weakly basic substances or their labile anhydrides, for example, ammonia and amines when in mixtures of a gas or liquid may be readily removed by passage through a strong acidic cation exchanger in the hydrogen form.

Since the reactions which occur in the resin beds are chemically reversible (but not thermally reversible), the exhausted anion or cation resin can be regenerated back to the respective hydroxyl or hydrogen forms by treatment with a base or an acid respectively. Using the symbol $(R)^+$ for the radical of a hydroxyl form strongly basic anion exchanger, the reaction involved in the removal of a weakly ionized acidic substance such as carbon dioxide is:

Reaction 1  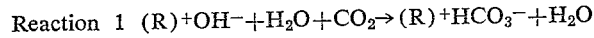
$(R)^+OH^- + H_2O + CO_2 \rightarrow (R)^+HCO_3^- + H_2O$

Again, using $(R)^-$ for the radical of a hydrogen form cation exchanger, the reaction for the removal of a weakly ionized basic substance such as ammonia is:

Reaction 2  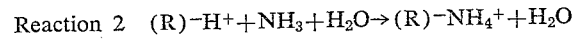
$(R)^-H^+ + NH_3 + H_2O \rightarrow (R)^-NH_4^+ + H_2O$

Note that $H_2O$ appears on both sides of Reactions 1 and 2 and is included merely to emphasize that the reactions take place rapidly in the presence of water.

The use of ion-exchange beds for the non-electrical method of removal of said weakly ionized substances has many disadvantages—one in particular being that the resin quickly exhausts itself. Thus, it loses its exchange or sorption capacity and to be reused must be regenerated back to its original hydroxyl or hydrogen form by treatment with strong mineral bases in the case of the anion exchanger, and with strong mineral acids in the case of the cation exchanger. However, this regeneration process is costly, laborious and time consuming and renders the process intermittent.

The invention hereinafter described eliminates the need of a separate regeneration step, thus effecting continuous removal without interruption. The invention provides an electrodeionization apparatus of the multi-membrane type and notwithstanding certain internal differences it resembles commercial units for brackish water demineralization. The unit of this invention comprises chambers defined by cation and anion permselective ion-exchange membranes arranged in alternating fashion, the cation membranes being substantially permeable only to the passage of cations (positively charged ions) and the anion membranes only to anions (negatively charged ions), thus forming alternating deionizing and concentrating chambers. The spaces between the membranes in the deionizing chambers are bridged by macroporous ion-exchange material (e.g., spheres, granules, saddles, helices, fibers, fabrics, or expanded sheets) which provide an electrically conductive path since in the application contemplated the gas or liquid passing through the sorber chambers may possess a relatively high electrical resistance. The filter of exchange material located in the sorber chambers also performs the function or sorbing or removing the low molecular weight ionizable substance in the same manner as occurs in the non-electric resin bed method, but with the advantage of avoiding a separate step for regeneration of the exhausted ion-exchange material. For the sorption of acidic substances (for example $CH_3SH$, $CH_3COOH$, $H_2S$, $SO_2$, $NO_2$, $CO_2$, $HCN$, $HF$, etc.), the sorber chambers of the unit are preferably filled with a particulate (e.g., spheric or granular) strongly basic anion-exchange resin. The intervening concentrating or stripping chambers may also be filled with particulate ion exchange resin, for example, anion and/or cation exchange resin or with an electrolytically conducting solution such as a solution of sodium sulfate. The combination of a sorber and concentrating chamber constitutes a cell pair. Any number of cell pairs can be stacked between a given pair of electrodes to give gas removal capacities of any desired amount.

In the sorption process a fluid feed stream, for example, moist atmospheric air containing carbon dioxide or gasoline containing mercaptans is passed through the sorber chambers having a bridge of strongly basic anion-exchange resin. The carbon dioxide, on contact with the hydroxyl form of the anion exchange filler, is removed from the air stream by chemisorption as the bicarbonate anion ($HCO_3^-$), as shown in Reaction 1 above. Mercaptans are similarly removed. Under the force of a D.C. electric potential, anions and cations tend to migrate out of the sorber chambers. Since these chambers are defined by an anion membrane on the anode side and a cation membrane on the cathode side, negatively and positively charged ions are restrained from migrating back into the sorber chambers. Thus, migration of the negatively charged ions (e.g., bicarbonate) occurs in the direction of the anode via the conducting bridge of anion-exchange resin through the anion-permeable membrane into the adjacent concentrating or flushing chambers. Since the further migration of anions out of the concentrating chambers is prevented by the barrier of a cation membrane, said anions become trapped in the concentrating chambers. According to the present invention, the anion-exchange bridge material in the sorber chambers is continuously and automatically regenerated back to its hydroxyl form while still remaining within the chambers. This is effected by operating the electrodeionization unit at current densities sufficient to produce polarization within the sorber chambers. For purposes of this disclosure, polarization is defined as the dissociation of water molecules into hydrogen ions and hydroxyl ions. In the operation of membrane units so called polarization films can form adjacent to the inner surfaces of those membranes defining those chambers from which ions migrate. This phenomenon occurs (if a high current density is used) whereby an interface at which there is an increase in transport number of the principal current carrier (for example the membrane/resin interface) becomes depleted by ions, so that further additional current can be transferred only by the hydrogen and hydroxyl ions formed at the ion-depleted interface by the dissociation of water. Polarization is thoroughly discussed in a publication entitled "Limiting Currents in Membrane Cells" by Rosenberg and Tirrell, Industrial and Engineering Chemistry, vol. 49, page 780, April 1957.

If the sorbing chambers are filled with anion exchange resin, the dissociation of water occurs at the interface of the resin with the cation membrane. The generated hydrogen ions pass out of the sorber chamber through the cation exchange membrane in an opposite direction to the migration of the anions formed by the sorption of the weakly ionized substance; that is, through the cation membrane and into the concentrating chamber where they become entrapped—preventing further migration. The hydroxyl ions generated by polarization migrate across the entire width of the sorber chamber via the bridge of anion exchanger. This provides the necessary basic environment for substitution of hydroxyl ions on the exchange site formerly held by anionic form of the sorbed weakly ionized substance. This regenerates said anion resin exchanger back to the hydroxyl form to effect further removal of weakly ionized substance from the entering fluid feed stream. The constant formation of hydroxyl ions effects uninterrupted regeneration, thus affording sorption rates and allowing the system to operate on a fully continuous basis. The regeneration reaction appears to occur as follows in the case of the sorption of carbon dioxide:

Reaction 3  $(R)^+HCO_3^- + (OH)^- \rightarrow (R)^+OH^- + (HCO_3)^-$

In the concentrating chambers the bicarbonate and hydrogen ions which migrated out of the sorber chambers mix and establish a dynamic equilibrium. This results in the release of carbon dioxide as follows:

Reaction 4  $(H)^+ + (HCO_3)^- \rightarrow H_2CO_3 \rightleftarrows CO_2\uparrow + H_2O$ The concentrated $CO_2$ (or other concentrate) may be removed or transferred to a flowing liquid gas stream circulated through the stripper chambers or permitted to bubble out of the chambers.

Means for supplying sufficient water to the sorber chambers is necessary. For example, the feed stream to the sorber chambers may be humidified by percolating the same through water. Where a flowing wash water stream is circulated through the stripper chambers, some water also will pass by capillary action through the membranes into the sorber chambers. Alternately, a water stream may be passed periodically directly into the sorber chamber. On the other hand a two phase mixture of water and the feed stream may be passed into the sorber chambers. Water is necessary in the sorber chambers for the following reasons:

(1) The weakly ionized substances are not ionized until dissolved in and/or reacted with the water in the ion exchange filler. For example, carbon dioxide, when dissolved in water, becomes weakly ionized carbonic acid.

(2) Polarization causes the dissociation of water to hydrogen and hydroxyl ions with their eventual migration out of the sorber chambers. A sufficient amount of water is necessary for this polarization reaction.

(3) By a process of electro-endosmosis, ions migrating electrically through membranes carry water with them. Since such water migration is out of the sorber chambers, water must be supplied for this purpose.

The various objects, features, and advantages of this invention will appear more fully in the following detailed description and accompanying drawing.

To better understand the invention, the description is made with specific reference to certain preferred embodiments and with reference to the removal of carbon dioxide gas from air stream. However, it is not to be construed as limited thereto except as defined in the appended claims.

By way of example, the use of this invention for the removal and sorption of gases and, in particular to the removal of carbon dioxide from atmospheric air, will be described in detail with reference to the accompanying drawing which represents a side elevational, schematic, sectional view of one embodiment of the invention. The drawing represents a multi-compartment unit for the gas phase sorption of acidic or basic gases—in particular, carbon dioxide removal from air stream. The unit N comprises a plurality of compartments or chambers. The two end chambers are cathode chamber 2 and anode chamber 4 having disposed respectively therein a negative electrode or cathode 6 and a positive electrode or anode 8. Between said electrodes is a stack of anion and cation permeable membranes arranged alternately and separated from each other by gasketing spacers 10 so as to define a plurality of alternating absorber chambers 12 and concentrating or washing chambers 14. There are many commercially available ion-permselective membranes which may be employed. The manufacture and properties of cation-permselective membranes are disclosed in U.S. Patents No. 2,702,272; No. 2,730,768; No. 2,731,408; and No. 2,731,411; and of anion-permselective membranes, in U.S. Patents No. 2,730,768; No. 2,800,445; and No. 2,860,097. The sorber chambers contain therein a bridge or filler 16 comprising granular, spherical, fibrous, woven, expanded, or foam shapes of a hydroxyl-form strong base anion exchanger. Spherical shapes are readily available commercially (such as "Dowex 1," "Dowex 2," and "Dowex 21K," tradenames for quaternary ammonium anion exchangers.

Inlet means for feeding the gas to be treated to the sorber chambers 12 are provided for by manifold inlet 17 and outlet means for the treated gas streams are indicated at manifold 18. Preferably, but not as a matter of necessity, the concentrating chambers 14 and the electrode chambers 2 and 4 are bridged or packed with ion-exchange material 19. The purpose of the filler in the concentrating and electrode chambers is to form a supporting electrically conductive bridge between the spaced membranes. Such material can consist of anion or cation exchangers, or a mixture thereof. These resins are readily available commercially from many sources. Where the washing solution of the concentrating and electrode chambers contain a sufficient concentration of ions to carry current across said chambers, no conductive bridge material is necessary. However, where, for example, distilled water, an organic liquid, or a gas feed stream is used as the flushing or washing fluid, it would be necessary to use a bridge material in said chambers to form an electrically-conductive bridge therein. Inlet means for providing a washing liquid (or in the alternative, a washing gas stream) into the concentrating and electrode chambers is provided by manifold 20. Outlet means for said waste stream is indicated at manifold 22. Means for passing a D.C. potential (from an outside source not shown) transversely through the stack of membranes and filled resin compartments is provided by leads 23 and 24.

The operation of the electrodeionization unit shown in the drawing may be illustrated, for example, by the removal of carbon dioxide from an atmospheric air stream. Where it is necessary to add liquid to the sorber chambers, the air feed stream can be made moist prior to entering said chambers by humidifying means (not shown in the drawing). The air is then fed in parallel to all the sorber chambers 12 by manifold conduit means 17, said air stream passing through the macroporous fillers of anion-exchange material 16, and out through effluent manifold conduit 18. Similarly, water (or an air stream) is introduced in parallel flow into the concentrating chambers 14 and electrode chambers 2 and 4 by inlet manifold means 20. Said stream passes through the resin bed in said chambers and passes out by means of effluent manifold 22. The liquid or gas streams flow through the chambers of the unit in a direction parallel to the membrane surfaces and at right angles to the flow path of direct electric current. Upon the impression of a polarizing current transversely across the unit, migration of the carbon dioxide as dicarbonate anions into the concentrating chambers will occur. The air is then withdrawn from the sorber chambers 12 with substantially less carbon dioxide therein.

Where the gas to be sorbed is a weakly basic gas, such as ammonia ($NH_3$), it would be necessary to replace the anion-exchange bridge of the sorber chambers with cation exchangers, and preferably a strongly acid cation exchanger. Strong acid cation exchangers are composed of a sulfonated copolymer of styrene and divinyl benzene and are commercially available from many sources. In operation the ammonia gas would be sorbed on the hydrogen-form, cation-exchange filler as a positively charged ammonium ion (e.g., see Reaction 2 above). Regeneration of the cation exchanger back to the hydrogen form would occur under polarized operation as follows:

Reaction 5

$(R)^-NH_4^+ + (H)^+ \rightarrow (R)^-H^+ + (NH_4)^+$

It is apparent that variations of the apparatus and process can be employed to carry out the purpose of this invention. For example, if a single pass of the gas feed mixture through one unit did not remove the required amount of the desired component, a series of multi-compartment repeating units might be used. This is particularly important where, in operation, it is desired to remove substantially all of a particular component from a gas mixture containing a relatively concentrated amount of said component. It is therefore advantageous to provide a plurality of single multi-compartment units. Each of said units connected in series by conduits with the effluent conduit of one unit being connected to the influent conduit of its next adjacent unit and so on. The gaseous feed mixture would then flow in series through each unit or stage removing in a single pass an aliquot portion of the component from the feed mixture. Also, a single unit can be employed in which the feed mixture is refluxed or recirculated therein until the degree of removal required is attained. Another variation would comprise placing separate units physically end-to-end and replacing the two immediately adjacent electrodes with a single electrode of the same polarity. Thus, the single electrode would be common to the two adjacent units. In effect, a single multi-unit cell is constructed comprising a number of single electrodeionization units, said multi-unit cell being defined between single terminal electrodes, and each single unit being defined and separated from its next adjacent unit by either a common anode or a common cathode. The common electrode is shared between two single units so that both sides of the electrode surface are actually used in the electrodeionization process. In operation, the effluent from the concentrating and sorber chambers of the first unit is fed into the corresponding influent conduits of the next adjacent unit and so on. This series of flow from one unit to the next adjacent unit continues throughout the multi-unit cell finally emerging from the last unit as separate waste and product streams. The use of common electrodes reduces the space requirements of the apparatus, and it also effects a substantial cost saving in electrode material.

The following examples are illustrative of the practice of this invention and are not intended to be limiting:

Example 1

An electrodeionization unit of the design of the drawing comprising six cell pairs, was used to sorb carbon dioxide from a gas mixture of nitrogen and carbon dioxide. The cathode was made of stainless steel 304 and the anode of platinum. The cation-exchange membranes were sulfonated copolymers of styrene and divinyl benzene, and the anion membranes were a quaternized copolymer of 2-vinyl pyridine and divinyl benzene. The filler material in the sorber chambers comprised 20–40 mesh beads of "Dowex 1" (a strong base anion exchanger). The concentrating and electrode chambers contained 20–40 mesh beads in a one:one mixture by volume of "Dowex 50," a strongly acid cation exchanger, and "Dowex 1," an anion exchanger ("Dowex 50" is a sulfonated copolymer of styrene and divinyl benzene which is available commercially). The gas feed mixture, containing 0.6 by volume of carbon dioxide was humidified by bubbling the gas feed stream through distilled water and was then directed in parallel flow to the six sorber chambers at a total influent flow rate of 4.4 liters per minute. Simultaneously distilled water was circulated through the concentrating and electrode chambers.

The unit was operated at a current density of 15.5 milliamps per square inch of membrane area. At steady state conditions the effluent gas stream was analyzed for carbon dioxide content using a "Lira" infrared analyzer. The results showed that the carbon dioxide content of the feed gas was reduced from 0.6% to 0.26% at a current efficiency of 78%.

Example 2

The strong base anion resin, located in the sorber chambers of the unit employed in Example 1, was replaced with a strong acid cation exchanger of "Dowex 50." A gas feed mixture of ammonia and nitrogen substantially saturated with water was passed through the sorber chambers at a rate of 2.75 liters per minute. Distilled water circulated through the concentrating and electrode chambers as a flushing stream.

A current density of 15.5 milliamps per square inch of membrane area was used. At steady state conditions the ammonia content of the feed gas was reduced from 0.6% to 0.34% at a current efficiency of 73%.

Example 3

The unit of Example 1 was used to sorb carbon dioxide from atmospheric air. In this example, however, no filler material of ion-exchange resin was used in the concentrating and electrode chambers. The air, containing 0.3% by volume of carbon dioxide, was fed to the sorber chambers at a total flow rate of 9 liters per minute. In conjunction with the air feed, distilled water at a rate of 2 millimeters per minute was directed simultaneously into the sorber chambers. A 0.1 normal solution of $Na_2SO_4$ was employed as the flushing liquid to supply conducting ions for the concentrating and electrode chambers. The unit was operated at a current density of 15 milliamps per square inch of membrane area. At steady state operation the effluent gas mixture from the scrubber or sorber chambers was collected and analyzed, and the results showed that the carbon dioxide content of the atmospheric air was reduced from 0.3% to 0.15%.

Example 4

A series of four electrodeionization units (as in Example 1) were used to remove substantially all of the $H_2S$ gas from a gaseous mixture of methane, hydrogen, and hydrogen sulfide. The gas mixture, containing 1% by volume of $H_2S$, was bubbled through water prior to entering the sorber chambers of the first unit in series. Water was recirculated through the concentrating chambers as the flushing liquid. The feed streams were flowed in series through each of the units. The effluent sorber stream was rebubbled through water prior to entering each unit. A current density of 3 milliamps per square centimeter of membrane area was applied to each unit in the series. The mixture, withdrawn from the sorber chambers of the last unit in the series, contained only 0.06% $H_2S$ gas.

Example 5

The unit of Example 1 was used to sorb methyl mercaptan from liquid isooctane. The isooctane contained 0.01 percent methyl mercaptan by weight and was fed into the sorber compartments. A 0.1 normal solution of $Na_2SO_4$ was employed as the flushing liquid to supply conducting ions for the concentrating and electrode chambers. The unit was operated at a current density of 15 milliamperes per square inch. The flow rate of the isooctane was adjusted to give a product containing 0.001 percent methyl mercaptan. The current efficiency was about 50 percent.

Thus, having described the invention, what is claimed is:

1. A process for separating substances which are weakly ionizable in water from electrically non-conducting substantially non-aqueous fluid homogeneous mixtures which are not appreciably soluble in water and which contain said substances comprising:
    (a) passing said electrically non-conducting, non-water soluble fluid mixture in the presence of moisture through at least one sorber chamber of at least one unit comprising at least two electrode chambers wherein are disposed a cathode and an anode respectively and at least one sorber chamber disposed between said electrode chambers and bounded by ion-selective membranes, at least the sorber chamber containing a macroporous filler therein of ion-exchange materials for sorbing said substance thereon, said filler being selected from the group consisting of strongly basic and strongly acidic ion-exchangers, the ion-selective membrane bounding the anode side of said sorber chamber being an anion selective membrane and the ion-selective membrane bounding the cathode side of said sorber chamber being a cation-selective membrane;

(b) passing a polarizing direct electric current transversely through the membranes and filler, said current being sufficient to cause the migration of at least part of said substance through one of the selective membranes, said current also being sufficient to dissociate at least a portion of said moisture present in said sorber chamber into hydrogen and hydroxyl ions; and (c) removing from said sorber chamber said non-conducting substantially non-aqueous fluid mixture containing a lesser amount of said substance than was present in said fluid mixture.

2. The process of claim 1 wherein the substance to be separated from said fluid mixture is a weakly acidic substance in the presence of water and wherein said sorber chamber contains a filler comprising strongly basic anion-exchangers.

3. The process of claim 1 wherein the substance to be separated from said fluid mixture is a weakly basic substance in the presence of water and wherein said sorber chamber contains a filler comprising strongly acidic cation-exchangers.

4. The process of claim 1 wherein the fluid mixtures are selected from the group consisting of gases, liquids, and mixtures thereof.

5. The process of claim 2 wherein the weakly acidic substance of the fluid mixture is carbon dioxide gas.

6. The process of claim 2 wherein the weakly acidic substance of the fluid mixture is hydrogen sulfide.

7. The process of claim 2 wherein the weakly acidic substance of the fluid mixture comprises mercaptans.

8. The process of claim 3 wherein the weakly basic substance of the fluid mixture is ammonia gas.

References Cited

UNITED STATES PATENTS

| | | | |
|---|---|---|---|
| 2,815,320 | 12/1957 | Kollsman | 204—180 |
| 2,854,393 | 9/1958 | Kollsman | 204—180 |
| 2,854,394 | 9/1958 | Kollsman | 204—180 |
| 3,014,855 | 12/1961 | Kressman | 204—301 |
| 3,074,864 | 1/1963 | Gaysowski | 204—301 |
| 3,149,061 | 9/1964 | Parsi | 204—301 |

FOREIGN PATENTS

| | | |
|---|---|---|
| 161,840 | 11/1952 | Australia. |
| 675,253 | 7/1952 | Great Britain. |
| 855,681 | 12/1960 | Great Britain. |
| 815,154 | 6/1959 | Great Britain. |
| 611,929 | 1/1961 | Canada. |

OTHER REFERENCES

Kunin; "Ion Exchange Resins," 2nd edition, John Wiley & Sons, Inc., New York, 1958, p. 113.

JOHN H. MACK, *Primary Examiner.*

JOHN R. SPECK, HOWARD S. WILLIAMS, *Examiners.*

J. L. BREWRINK, E. ZAGARELLA *Assistant Examiners.*